United States Patent [19]

Kremer

[11] 4,186,333
[45] Jan. 29, 1980

[54] CIRCUIT FOR THE ENERGY-CONSERVING BRAKING OF A DIRECT-CURRENT SERIES-WOUND MOTOR ESPECIALLY FOR VEHICLES

[75] Inventor: Manfred Kremer, Hamburg, Fed. Rep. of Germany

[73] Assignee: Still GmbH, Hamburg, Fed. Rep. of Germany

[21] Appl. No.: 785,691

[22] Filed: Apr. 7, 1977

[30] Foreign Application Priority Data

Apr. 8, 1976 [DE] Fed. Rep. of Germany ....... 2615204

[51] Int. Cl.$^2$ ............................................. H02P 3/14
[52] U.S. Cl. ................... 318/376; 318/345 G; 318/269
[58] Field of Search ................ 318/269, 376, 378–380, 318/345 G, 377, 375

[56] References Cited

U.S. PATENT DOCUMENTS

| 3,188,547 | 6/1965 | Zelina | 318/380 |
| 3,419,778 | 12/1968 | Gurwicz | 318/345 G |
| 3,826,962 | 7/1974 | Morton et al. | 318/376 |

*Primary Examiner*—Gene Z. Rubinson
*Assistant Examiner*—M. K. Mutter
*Attorney, Agent, or Firm*—Karl F. Ross

[57] ABSTRACT

A circuit for the energy-conserving braking of an electrically powered vehicle having a series-wound direct-current motor with field winding and armature connected in series with a high-ohmic resistance across the battery connection is effected by a main thyristor is provided with a second thyristor serving to quench the first thyristor. A capacitor (quenching capacitor) is included in a commutating device or network parallel to the main thyristor. A voltage sensor responsive to the voltage level at the junction between the condenser and the main thyristor controls the commutating circuit.

4 Claims, 1 Drawing Figure

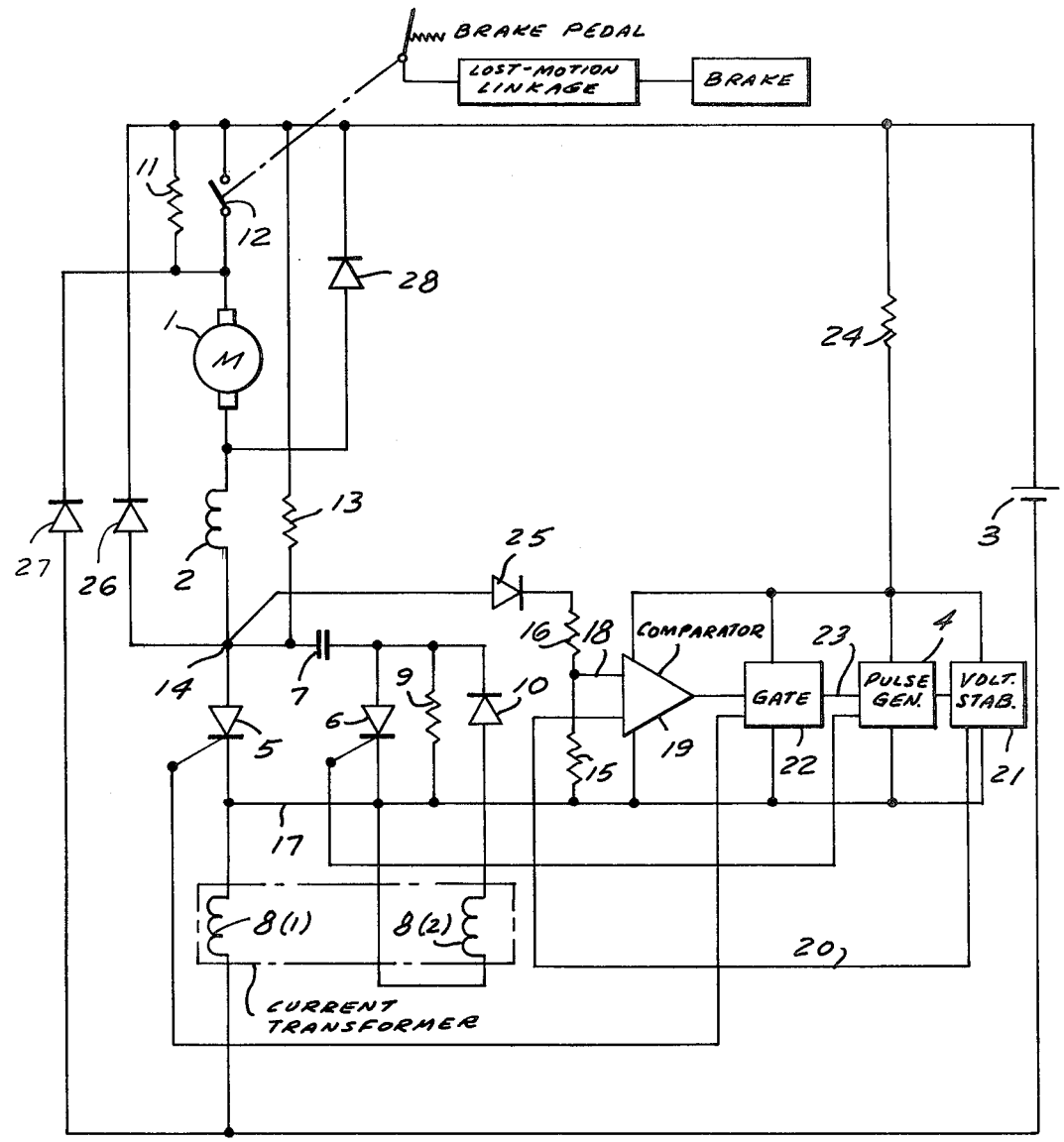

CIRCUIT FOR THE ENERGY-CONSERVING BRAKING OF A DIRECT-CURRENT SERIES-WOUND MOTOR ESPECIALLY FOR VEHICLES

FIELD OF THE INVENTION

The present invention relates to a circuit for the energy-conserving braking of a direct-current series-wound motor and, especially, for the braking of an electrically powered vehicle driven by a direct-current series-wound motor.

BACKGROUND OF THE INVENTION

It is known to provide a battery-powered vehicle, often an industrial vehicle such as a forklift truck or, more generally, vehicles driven by battery power, with a direct-current series-wound electric motor having an armature connected in series with the field winding of the motor.

To control the motor, a main thyristor is connected in series with the motor across the battery and is triggered into operation by a pulse generator, thereby effecting so-called pulse control of the vehicle speed.

More specifically, a resistor is connected in series with the direct-current motor across the battery and can be bridged by a switch. Such circuitry is commonly available for electronic pulse control of an electrically powered vehicle using a battery as the source of electrical energy.

For the braking of the vehicle, it is common practice to use the motor as a generator and to dissipate the electrical energy which is thereby produced. For maximum economy of operation, it is advantageous to return the electrical energy gained during motor braking, i.e. the electrical energy produced by the motor when the latter is operated as a generator, to the battery.

The resistor connected in series between the motor and the battery is usually dimensioned so that self-excitation of the motor/generator will be permitted.

The capacitor is included in a commutating network which is charged after quenching of the main thyristor via the resistor, the latter being traversed, during the braking operation, by the excitation current, and through a second thyristor, i.e., a so-called quenching thyristor.

In prior-art circuits of this type, the resistor connected in series with the motor and through which the excitation current flows has a low resistance value, i.e. is a low-ohmic resistor. The capacitor of the commutating device is thus able to be charged relatively rapidly through this resistor so that no difficulties are encountered because of a lag in the capacitor charging. However, since this resistor has a small resistance value, a relatively large current flows through this resistor and substantial amounts of energy are dissipated therein as heat, thereby reducing the economy of the system. An additional problem is the abstraction or removal of the large quantity of heat thus produced.

OBJECTS OF THE INVENTION

It is the object of the present invention to improve upon a circuit of the aforedescribed type and enable the energy losses in the aforementioned resistor to be sharply reduced and, in spite of this reduction of energy losses, to prevent difficulties resulting from a slow recharging of the capacitor.

It is another object of the invention, to provide the conditions necessary for the ignition of the main thyristor in the shortest possible time while nevertheless eliminating the high energy losses characterizing earlier systems.

SUMMARY OF THE INVENTION

These objects are attained, in accordance with the present invention, by substituting a high ohmic resistor for the low ohmic resistor used heretofore in series with the motor and connecting the junction between the motor and the main or first thyristor and the capacitor, on the one hand, and the cathode terminal of this thyristor on the other hand across a voltage-sensing means which operates the commutator in which the capacitor is connected and which serves for quenching the first or main thyristor.

According to a feature of the invention, the commutator circuit includes a second thyristor whose anode terminal is connected to the second side of the capacitor whose first side is connected to the anode terminal of the first or main thyristor. The cathode terminals of the two thyristors are connected together. Each of the thyristors is connected in series with a respective winding of a current transformer while the voltage-sensing means operates a gating network which, in turn, controls the first or main thyristor, i.e. is connected to the gate terminal thereof.

According to still another feature of the invention, in series with the winding of the current transformer connected to the second thyristor, there is provided a diode in such configuration that the diode and this latter winding are connected across the anode and cathode terminals of the second thyristor, i.e. connect the anode and cathode terminals of the latter together. It has been found to be advantageous to provide, parallel to the second or quenching thyristor, a resistor which is connected across the anode and cathode terminals thereof while still another resistor is connected across the series-wound electric motor, i.e. bridges the series network consisting of the field winding and armature thereof.

According to still another feature of the invention, the voltage-sensing means is provided as a voltage divider consisting of at least two resistors in series, the voltage divider being connected to the junction between the motor and first thyristor, on the one hand, and to the common cathode terminals of the two thyristors on the other hand. The output voltage of the voltage divider is tapped from between the two resistors thereof and is applied to a voltage comparator, e.g. an operational amplifier, which also receives a predetermined reference voltage, e.g. from a voltage stabilizer. The output of the comparator is connected, in turn, to the aforementioned gating circuit which also receives an input from the pulse generator which serves to provide pulse control of the electric motor. Advantageously, the gating circuit is connected to the gate of the first thyristor as noted previously.

With the aforedescribed circuit, the resistance through which the self-excitation current flows, can have an extremely high resistance value, i.e. can be a high ohmic resistor, which would normally be expected to permit charging of the capacitor of the commutating arrangement only very slowly. If this capacitor is not sufficiently charged to permit a new ignition of the main or first thyristor and the level of charge of the capacitor does not suffice for the necessary quenching of the main thyristor so that a problem might arise, the voltage detector means or voltage sensor detects this low level and prevents ignition of the main thyristor until a sufficient charge has been built up in the capacitor.

Thus the system is effective in spite of the fact that the time constant of the resistance capacitance network formed by the resistor in series with the motor and the capacitor has a value which is so high that the capacitor would be expected to be charged too slowly. Hence the circuit of the present invention makes it possible to substitute a high-ohmic resistor and nevertheless permit troublefree operation.

The conventional portions of the circuit, of course, operate in the usual manner, it being understood that the prior art circuit is improved in the system of the present invention through the use of the voltage divider, comparator and gating circuit, together with the ancillary source of reference voltage, as described.

BRIEF DESCRIPTION OF THE DRAWING

The above and other objects, features and advantages of the present invention will become more readily apparent from the following description, reference being made to the accompanying drawing, the sole FIGURE of which is a circuit diagram illustrating the principles of the present invention.

SPECIFIC DESCRIPTION

The vehicle motor comprises an armature 1 and a field winding 2 and is of the direct-current series-wound type. The motor 1, 2 is energized and driven by electric power from a battery 3 which can be charged in the conventional manner. The motor current is controlled via a pulse generator represented at 4.

A control circuit is provided between the pulse generator 4 and the motor and comprises a first thyristor 5, hereinafter referred to as the main thyristor, and a second thyristor 6 referred to as the quenching thyristor.

The gate of the second thyristor 6 is triggered by the pulse generator 4. Between the anodes of the two thyristors 5 and 6, there is provided a capacitor 7 (quenching condenser).

At their cathode sides, each of the thyristors 5 and 6 is connected in series with one winding of a current transformer 8. Thus the primary winding 8(1) is connected between the cathode side of the main thyristor 5 and the negative terminal of the battery 3, while the cathode side of the quenching thyristor 6 is connected in series with the secondary winding 8(2) of the current transformer which is in series with a diode 10 and is returned thereby to the anode of the thyristor 6.

In parallel to the thyristor 6, i.e. across the anode and cathode thereof, there is a resistor 9.

The armature 1 and the field winding 2 of the motor 1, 2 are connected in series and are tied between the positive terminal of the battery 3 and the anode of the main thyristor 5, preferably via a switch 12. To this extent the circuit conforms to the prior art.

The circuit also includes, in accordance with prior-art teachings, in series with the armature 1 and the field winding 2 of the motor 1, 2, a resistor 11 which is shunted by the switch 12 and hence is connected between the armature 1 and the positive terminal of battery 3.

In prior-art circuits for the control of the direct-current series motor, the resistance 11 is constituted by a resistor having a low ohmic value and a correspondingly large volume to be able to sustain the high power loss thereacross. For example, the resistor could have a resistance value of about 5 ohms so that, when the voltage applied accross the terminals of battery 3 was about 80 volts, the power loss in the resistor was about 1280 watts. In contrast with the prior-art circuit, however, the circuit of the present invention provides a resistor 11 having a high ohmic value. For example, the resistor 11 can have a resistance of, say, 68 ohms so that, with 80 volt drive from the battery, the power loss in the resistor 11 is only about 94 watts, i.e. the power loss in the resistor amounts to only about 7% of the loss arising with a conventional resistor having a resistance value of 5 ohms.

The high resistance value of resistor 11 signifies that the capacitor 7 can be charged over this resistor only relatively slowly since the resistance 13 in shunt across the armature 1 and the field coil 2 of the motor 1, 2, serves an entirely different purpose and is a very high ohmic resistor so that it can influence the charging of capacitor 7 only to an insignificant extent. In other words, while the capacitor 7 can charge through the resistor 11 relatively slowly, it charges far more slowly via the resistor 13, i.e. extremely slowly.

Nevertheless the resistors 13 and 9 permit a precharging of the capacitor 7. The charging is effected in accordance with an e-function whose time constant is greater as the ohmic values of the resistors connected in series with the capacitor 7 across the battery 3 are greater.

If the voltage at the tie point 14 (between the anode of thyristor 5 and the field coil, between the field coil 2 and the capacitor 7, between the anode of thyristor 5 and capacitor 7, etc.) is too low, because the capacitor 7 has not been sufficiently precharged, and under these conditions the thyristor 5 is fired, only a small current will traverse the primary winding 8(1) of the current transformer and the diode 10 so that, during the subsequent quenching stage, insufficient quenching energy is available and the thyristor 5 is not quenched. This is capable of disturbing the operation of the circuit.

If, under these conditions, the accelerator pedal of the vehicle is actuated, the vehicle is not driven and a failure signal is generated.

To avoid this condition, the tie point 17 is connected to one side of a voltage divider 15, 16 whose other side is connected to the bus bar 17.

The voltage divider 15, 16 comprises a pair of resistors connected in series with one another and in series with a diode 25. A conductor 18, connected between the resistors 15 and 16 of the voltage divider, applies a potential therefrom to a comparator 19, here shown as an operational amplifier, whose reference voltage is applied by a conductor 20 from a voltage stabilizer 21.

The output of the comparator 19 is applied to a gate circuit 22 which also receives an input via line 23 from the pulse generator 4 so that an output is generated by the gate circuit 22 when the voltage at the tie point 14 is sufficiently high, i.e. the voltage at line 18 and applied to the comparator 19 is greater than the voltage (reference voltage) applied by line 20 to the comparator from the voltage stabilizer 21. This prevents ignition of the thyristor 5 when the capacitor 7 is insufficiently charged. The voltage of the capacitor rapidly reaches a sufficient level so that the operator of the vehicle does not notice this delay or lag.

The resistor 24 is provided as a preresistor for the voltage stabilizer 21. The diode 25 protects the voltage divider against negative voltage peaks.

While the resistor 11 has a high resistance value (high ohmic value), circuit elements 15 through 23 prevent the ignition of the thyristor 5 at excessively low voltages. In other words the thyristor 5 is not ignited when the voltage at this anode is too low for effective operation of the vehicle.

The braking current generated by the motor 1, 2 is returned to the battery 3. The circuit illustrated does not prevent a countercurrent braking, i.e., a braking when the motor is switched into reverse direction. It is, however, improbable that the vehicle operator will desire countercurrent braking in reverse and, to this end the circuit can be designed so that upon actuation of the brake pedal independently from the vehicle direction switch, the rearward protection is switched in. In this case, motor braking is only effective when the vehicle is rolling forwardly.

The motor operates in self-excitation, whereby the excitation process is effected via the resistor 11. Upon blocking of the first thyristor 5, the energy stored in the motor is drained via the free-running diode 26 and the braking diode 27. When, with high speed of the armature 1, the armature voltage exceeds the terminal voltage of the battery 3, the diode 28 is conducting in the forward direction and the braking energy is returned to the battery.

While the brake pedal has not been illustrated in detail in the drawing and is connected, in the usual manner, with a mechanical brake, it will be understood that the actuation of the mechanical brake is effected via a lost-motion linkage, the actuation of the brake pedal initially opening switch 12 before being effective to engage the mechanical brake.

Depending upon the setting of the brake actuator, the vehicle is braked to a greater or lesser extent. The electrical braking effect increases with increasing speed. The stepless control permits the vehicle to travel at practically any desired speed even downhill. The motor cannot be loaded to a greater extent than with resistance braking.

I claim:

1. A circuit for the braking of an electrically powered vehicle by transforming braking energy into electrical energy and collecting said electrical energy, said circuit comprising:
    a battery;
    a series direct-current motor having an armature connected in series with a field winding connectible to said battery;
    a main thyristor having its anode-cathode terminals connected in series with said motor across said battery;
    a resistor connected in series with said motor across said battery;
    a switch connected in parallel to said resistor;
    a quenching capacitor connected to a junction between said motor and said thyristor;
    commutator means in circuit with said capacitor for controlling the quenching of said thyristor;
    voltage-sensing means connected between said junction and the cathode of said thyristor and responsive to the voltage of said capacitor for operating said commutator means;
    a free-running diode connected across said motor and said resistor;
    a braking diode connected across said battery and said resistor; and
    a third diode connected across said armature and said resistor,
    said commutator means comprising a second thyristor having an anode and a cathode said capacitor being bridged across the anodes of said thyristors, the cathode of said second thyristor being connected to the cathode of said main thyristor, each of said thyristors being connected in series with respective windings of a current transformer, said circuit further comprising a gate network responsive to said voltage-sensing means and connected to the gate of said main thyristor for controlling same.

2. The circuit defined in claim 1, further comprising a further diode connected in series with the respective winding of said current transformer, said further diode and the winding of said current transformer in series therewith being bridged across the anode and cathode of said second thyristor.

3. A circuit for the braking of an electrically powered vehicle by transforming braking energy into electrical energy and collecting said electrical energy, said circuit comprising:
    a battery;
    a series direct-current motor having an armature connected in series with a field winding connectible to said battery;
    a main thyristor having its anode-cathode terminals connected in series with said motor across said battery;
    a resistor connected in series with said motor across said battery;
    a switch connected in parallel to said resistor;
    a quenching capacitor connected to a junction between said motor and said thyristor;
    commutator means in circuit with said capacitor for controlling the quenching of said thyristor;
    voltage-sensing means connected between said junction and the cathode of said thyristor and responsive to the voltage of said capacitor for operating said commutator means;
    a free-running diode connected across said motor and said resistor;
    a braking diode connected across said battery and said resistor; and
    a third diode connected across said armature and said resistor,
    said voltage sensing means comprising at least two resistors forming a voltage divider network having one terminal connected to said main thyristor, a comparator receiving one output tapped from between the resistors of said voltage divider, a voltage regulator applying a reference voltage to said comparator, said gate network energized by said comparator, and a pulse generator for controlling said motor and having an output feeding said gate network.

4. A circuit for the braking of an electrically powered vehicle by transforming braking energy into electrical energy and collecting said electrical energy, said circuit comprising:
    a battery;
    a series direct-current motor having an armature connected in series with a field winding connectible to said battery;
    a main thyristor having its anode-cathode terminals connected in series with said motor across said battery;

a resistor connected in series with said motor across said battery;

a switch connected in parallel to said resistor;

a quenching capacitor connected to a junction between said motor and said thyristor;

commutator means in circuit with said capacitor for controlling the quenching of said thyristor;

voltage-sensing means connected between said junction and the cathode of said thyristor and responsive to the voltage of said capacitor for operating said commutator means;

a free-running diode connected across said motor and said resistor;

a braking diode connected across said battery and said resistor; and a third diode connected across said armature and said resistor, said resistor constituting a high-ohmic resistor, said circuit further comprising a first resistor linked to said capacitor opposite said junction and to the cathode of said thyristor and a second resistor bridged across said armature and the field winding of said motor.

* * * * *